United States Patent [19]

Capolupo et al.

[11] 4,402,858

[45] Sep. 6, 1983

[54] HYDROLYTICALLY STABLE ANTIOXIDANT COMPOSITION

[75] Inventors: Janet D. Capolupo, Thomaston; Elmar H. Jancis, Naugatuck, both of Conn.

[73] Assignee: Uniroyal, Inc., New York, N.Y.

[21] Appl. No.: 368,332

[22] Filed: Apr. 14, 1982

[51] Int. Cl.$^3$ ............................ C08K 5/52; C08K 5/09
[52] U.S. Cl. ............................... 252/400 A; 524/147; 524/151; 524/397; 524/399; 524/394; 524/400
[58] Field of Search ............ 252/400 A; 524/128, 524/135, 137, 147, 151, 163, 178, 204, 328, 329, 397, 399, 394, 400

[56] References Cited

U.S. PATENT DOCUMENTS

| | | | |
|---|---|---|---|
| 3,202,622 | 8/1965 | Scullin et al. | 524/147 |
| 3,274,135 | 9/1966 | Norman et al. | 524/147 |
| 3,351,576 | 11/1967 | Oakes | 252/400 A |
| 3,928,267 | 12/1975 | Rhodes et al. | 524/399 |
| 4,118,352 | 10/1978 | Häberlein et al. | 252/400 A |
| 4,233,208 | 11/1980 | Spivack | 524/147 |
| 4,282,141 | 4/1981 | Minagawa et al. | 252/400 A |
| 4,283,295 | 8/1981 | de Vries et al. | 252/400 A |
| 4,341,880 | 7/1982 | Toyoda et al. | 524/128 |

*Primary Examiner*—Irwin Gluck
*Attorney, Agent, or Firm*—Andrew D. Maslow

[57] ABSTRACT

Stabilizing composition comprising (I) a phosphite $P(OR)_3$ and (II) an organic metal salt $M(OOCR^1)_n$, the P/M molar ratio being from 78/1 to 900/1.

3 Claims, No Drawings

HYDROLYTICALLY STABLE ANTIOXIDANT COMPOSITION

The present invention provides a stabilizing composition comprising certain phosphite antioxidants and an organic metal salt, said composition having improved hydrolytic stability.

The use of phosphites such as triphenyl phosphite or alkylated triphenyl phosphites as antioxidants in rubbers and plastics is well known to the art. It is also known that such phosphites have a tendency to hydrolyze upon exposure to moisture, causing reduction in their antioxidative efficacy. Various means have been employed to overcome this deficiency such as by the addition of effective amounts of tertiary amines such as tripropanolamine. However, amines may lead to undesirable discoloration of the phosphite due to their ability to form chelates with traces of metal residue, such as iron, in the phosphite mixtures.

The following references of interest disclose combinations of phosphite stabilizers with other ingredients, including organic metal salts.

U.S. Pat. No. 3,928,267, Dec. 23, 1975 (Rhodes et al), teaches a method for stabilizing vinyl polymer and to impart antifogging and antistatic properties to said polymer by the addition of aliphatic or cycloaliphatic epoxy compound, a polyvalent metal salt of a monocarboxylic acid, a phosphite stabilizer and a partial ester of a polyglycerol. The molar ratios of said phosphite to said salt are well below those contemplated by this invention.

Chemical Abstracts 86 107541e (1977) refers to Japanese patent publication No. 76142047, which discloses a stabilizing composition of epoxy compounds, a phosphite and an organic metal salt, the molar ratios of the phosphite to said salt being much lower than taught by the instant invention.

It has now been found that certain phosphite compounds may be effectively stabilized against hydrolysis by admixture of relatively small amounts of organic metal salts, providing compositions of exceptional resistance against moisture. More specifically, this invention teaches liquid stabilizing compositions comprising a compound having the structural formula $P(OR)_3$, wherein the R groups may be the same or different and are $C_6$–$C_{18}$ alkyl, $C_6$–$C_{10}$ aryl, phenyl substituted with one to two $C_1$–$C_{18}$ linear or branched alkyl radicals; and an organic metal salt having the structural formula $M(OOCH^1)_n$, wherein $R^1$ is $C_6$–$C_{26}$ alkyl or alkenyl; M is a metal ion selected from lithium, sodium, potassium, calcium, magnesium, zinc, barium, manganese, copper, nickel, iron, tellurium, and cadmium, and n represents the valence of M; wherein the molar P/M ratio is from 78/1 to 900/1. It is preferred that such compositions are clear liquids. Usually the R's are the same or different and are alkyl, phenyl or phenyl substituted with linear or branched $C_6$–$C_{12}$ alkyl, M is selected from calcium, magnesium, zinc and barium, and the molar P/M ratio is from 85/1 to 800/1. Especially useful compositions are those wherein the R's are the same and are phenyl substituted with one linear or branched $C_6$–$C_{12}$ alkyl group, M is selected from calcium and zinc, and the P/M molar ratio is from 100/1–400/1. Representative phosphites, including triphenyl phosphite, dihexyl phenyl phosphite, diphenyl octadecyl phosphite, di(nonylphenyl) dodecyl phosphite, dedecyl tolyl phosphite, trioctadecyl phosphite, tridodecyl phosphite, tri(dihexylphenyl) phosphite, tri(nonylphenyl) phosphite, tri(octadecylphenyl) phosphite, di(didodecylphenyl) dodecylphenyl phosphite, di(dioactadecylphenyl) octadecyl phosphite, tri(dinonylphenyl) phosphite, di(dinonylphenyl) nonylphenyl phosphite, di(nonylphenyl) dinonylphenyl phosphite, or mixtures thereof.

Suitable organic metal salts useful for this invention are lithium hexacosanoate, sodium eicosanoate, potassium heptadecanoate, calcium dihexanoate, calcium dioctadecanoate, zinc didodecanoate, barium diheptanoate, barium dioctadecanoate, manganese dioctanoate, copper octanoate, nickel dihexanoate, iron tridecanoate, tellurium tetraoctanoate, cadmium dinonadecanoate and the like. Especially preferred are zinc didodecanoate, zinc dioctadecanoate, calcium didodecanoate and calcium dioctadecanoate.

The above compositions can readily be prepared by heating the phosphite stabilizer to about 110°–150° C., usually 110°–130° C., and then adding thereto the organic metal salt while agitating. It is advisable to carry out the addition under a blanket of inert atmosphere such as dry nitrogen gas or in a closed vessel, in the absence of moisture. Having prepared the compositions, no further precautions seem necessary concerning moisture due to the outstanding hydrolytic stability of the compositions even at the low concentrations of organic metal salt present. The resultant clear liquid compositions may then be added to organic materials having a tendency to deteriorate due to environmental influences such as air or heat in an amount effective to protect such materials. For example, 2.5 parts by weight of the composition represented by Run No. 3 in the Table below may be mixed with 100 parts by weight of polypropylene plastic to protect from deterioration.

The hydrolytic stability of a phospite or phosphite composition can be determined in several ways. The one recommended is described in the following example.

EXAMPLE

To 344 g (0.5 mol) of tri(nonylphenyl) phosphite, heated to 115° C. while stirring was added 2.6 g (4.3 mmol) calcium dioctanoate, and agitation was maintained at this temperature for about two hours at which time the mixture was non-opaque. This composition, when cooled to room temperature (ca. 27° C.), remained clear and slightly viscous. The P/M molar ratio (M being calcium) was 116 (Run No. 3 in the Table below). Other compositions were prepared in the same manner except the P/M ratios were varied, namely 175/1 (Run No. 2) and 87/1 (Run No. 4). The phosphite not containing the organic metal salt was also tested (Run No. 1).

The hydrolytic stability of the compositions was determined in the following manner:

To a 250 ml beaker, equipped with a thermometer, a pH meter and a stirrer was added 150 ml of deionized water and heated to 55°–60° C. Then 4.5 g of the respective compositions were added to the water while maintaining heating and stirring. pH readings were taken frequently with the results tabulated below, it being understood that lowering of pH values is an indication of phosphite hydrolysis.

| | pH Determination Run No. | | | |
| --- | --- | --- | --- | --- |
| | 1 | 2 | 3 | 4 |
| $M(OOCR^1)^*$, % | 0 | 0.5 | 0.75 | 1.5 |

-continued

| | pH Determination Run No. | | | |
|---|---|---|---|---|
| | 1 | 2 | 3 | 4 |
| P/M, molar | — | 175/1 | 116/1 | 87/1 |
| pH after: | | | | |
| 2 hrs. | 4.8 | 7.2 | 7.5 | 7.8 |
| 4 hrs. | 2.8 | 7.2 | 7.6 | 7.7 |
| 6 hrs. | <1.0 | 7.0 | 7.6 | 7.6 |

*Calcium dioctadecanoate

The data clearly indicate the superior hydrolytic stability of the compositions of this invention over the phosphite alone.

It may also be noted that seemingly compositions wherein the P/M molar ratios above 85/1 do not provide very much improved results, although compositions having P/M values of 78/1 or even higher may be used.

Compositions which under the above testing conditions result in a pH value (after 6 hours of exposure) of less than 7.0 are not acceptable. It will be apparent to the practitioner that invariably phosphites have somewhat different acid numbers or possibly residual hydrochloride contents which may affect hydrolytic stability. It is believed that these detriments are successfully overcome by this invention, i.e., higher acid number phosphites may need higher organic metal salt additions, resulting in lower P/M ratios.

What is claimed is:

1. A stabilizing composition having improved hydrolytic stability comprising a phosphite having the structural formula $P(OR)_3$, wherein the R groups may be the same or different and are linear or branched $C_6-C_{18}$ alkyl, $C_6-C_{10}$ aryl or phenyl substituted with one or two linear or branched $C_1-C_{18}$ alkyl radicals; and an organic metal salt having the structural formula $M(OOCR^1)_n$, wherein $R^1$ is $C_6-C_{26}$ alkyl or alkenyl, M is selected from lithium, sodium, postassium, calcium, magnesium, zinc, barium, manganese, copper, nickel, iron, tellurium and cadmium, and n represents the valence of M, the molar P/M ratio being from 78/1 to 900/1.

2. The composition of claim 1 wherein R is $C_8-C_{18}$ alkyl, phenyl, or phenyl substituted with $C_6-C_{12}$ alkyl radicals; M is selected from calcium, magnesium, zinc and barium, and the molar P/M ratio is from 85/1 to 800/1.

3. The composition of claim 1, wherein the R groups are the same and are phenyl substituted with one $C_6-C_{12}$ alkyl group; M is selected from calcium and zinc, and the molar P/M ratio is from 100/1 to 400/1.

* * * * *